United States Patent
Itaya et al.

[11] Patent Number: 5,876,581
[45] Date of Patent: *Mar. 2, 1999

[54] FILM OF IRON (III) HEXACYANOFERRATE (II) AND PROCESS OF SYNTHESIZING SAME

[75] Inventors: Kingo Itaya, Tagajo; Kimio Shibayama; Shinobu Toshima, both of Sendai; Tatsuaki Ataka; Koji Iwasa, both of Tokyo, all of Japan

[73] Assignee: Seiko Instruments Inc., Japan

[ * ] Notice: The term of this patent shall not extend beyond the expiration date of Pat. No. 4,498,739.

[21] Appl. No.: 445,874

[22] Filed: May 22, 1995

Related U.S. Application Data

[63] Continuation of Ser. No. 159,032, Nov. 29, 1993, abandoned, which is a continuation of Ser. No. 562,440, Jul. 30, 1990, abandoned, which is a continuation of Ser. No. 428,417, Oct. 27, 1989, abandoned, which is a continuation of Ser. No. 188,180, Apr. 28, 1988, abandoned, which is a continuation of Ser. No. 21,626, Mar. 2, 1987, abandoned, which is a continuation of Ser. No. 884,874, Jul. 9, 1986, abandoned, which is a continuation of Ser. No. 387,470, Jun. 11, 1982, abandoned.

[30] Foreign Application Priority Data

Oct. 2, 1981 [JP] Japan ................................. 56-156970

[51] Int. Cl.⁶ .............................. C25D 9/08; G02F 1/15
[52] U.S. Cl. ................. 205/316; 204/290 R; 204/292; 205/57; 205/66; 205/479; 205/491; 359/265; 359/266; 359/270; 359/273; 429/218; 429/221

[58] Field of Search ................. 204/91; 205/316, 205/57, 66, 479, 491

[56] References Cited

U.S. PATENT DOCUMENTS

| | | | |
|---|---|---|---|
| 1,911,808 | 11/1933 | Collins | 204/181.4 |
| 2,312,898 | 1/1943 | Ham et al. | 204/131 |
| 2,353,782 | 7/1944 | Neumark | 204/91 |
| 3,707,449 | 12/1972 | Reinhardt et al. | 204/91 |
| 4,451,339 | 5/1984 | Kranz et al. | 204/91 |
| 4,498,739 | 2/1985 | Itaya et al. | 350/357 |

FOREIGN PATENT DOCUMENTS

| | | | |
|---|---|---|---|
| 697606 | 11/1979 | U.S.S.R. | 204/91 |
| 734 | of 1856 | United Kingdom | 204/91 |
| 14089 | of 1893 | United Kingdom | 204/91 |

*Primary Examiner*—T. Tung
*Attorney, Agent, or Firm*—Adams & Wilks

[57] ABSTRACT

A process for synthesizing iron(III) hexacyanoferrate(II) as a blue insoluble product on the surface of a working electrode is disclosed which comprises immersing a pair of electrodes in a solution mixture of an iron(III) ion-containing solution and a hexacyanoferrate(III) ion-containing solution and effecting electrolysis with one of the electrodes as an anode and the other as a cathode, whereby iron(III) hexacyanoferrate(II) is deposited on the surface of the cathode.

15 Claims, 5 Drawing Sheets

FILM OF IRON (III) HEXACYANOFERRATE (II) AND PROCESS OF SYNTHESIZING SAME

This is a continuation of application Ser. No. 08/159,032 filed Nov. 29, 1993 which is a continuation of application Ser. No. 07/562,440 filed Jul. 30, 1990 which is a continuation of application Ser. No. 07/428,417 filed Oct. 27, 1989 which is a continuation of application Ser. No. 07/188,180 filed Apr. 28, 1988 which is a continuation of application Ser. No. 07/021,626 filed Mar. 2, 1987 which is a continuation of application Ser. No. 06/884,874 filed Jul. 9, 1986 which is a continuation of application Ser. No. 06/387,470 filed Jun. 11, 1982, all now abandoned.

BACKGROUND OF INVENTION

This invention relates to a solid film of iron(III) hexacyanoferrate(II) deposited upon a electronically conductive surface and the process for synthesizing same.

The iron(III) hexacyanoferrate(II) used herein is a blue pigment which is generally known as Prussian blue.

It is well known from the past that the mixing of an aqueous solution containing $Fe(II)(CN)_6^{4-}$ or $Fe(III)(CN)_6^{3-}$ results in a variety of precipitates as shown in Table 1. These reactions have been widely utilized for the qualitative analysis of the ions referred to in Table 1. The Prussian blue shown in Table 1 has been widely used as a blue pigment for printing ink and the like since its discovery in 1704.

Table 1 is a list of the materials which result when aqueous solutions containing Fe(II) or Fe(III) ion are mixed with aqueous solutions containing $[Fe(II)(CN)_6]^{4-}$ or $[Fe(III)(CN)_6]^{3-}$ ion.

TABLE 1

| | Cyanoferrate ion | |
| --- | --- | --- |
| Iron ion | Ferrocyanide ion $[Fe(II)(CN)_6]^{4-}$ | Ferricyanide ion $[Fe(III)(CN)_6]^{3-}$ |
| ferrous ion Fe(II) | Everitt's salt $K_2Fe(II)[Fe(II)(CN)_6]$ white precipitate | Turnbull's blue $KFe(II)[Fe(III)(CN)_6]$ blue precipitate |
| ferric ion Fe(III) | Prussian blue $KFe(III)[Fe(II)(CN)_6]$ or $Fe(III)_4[Fe(II)(CN)_6]_3$ blue precipitate | Prussian brown clear brown solution |

In Table 1, Prussian blue and Turnbull's blue which had been considered to be different compounds were recently identified as a single chemical compound by a variety of physicochemical measurements, including Mossbauer spectroscopy and absorption spectroscopy.

Among the prior art processes known for the synthesis of Prussian blue have been known comprising mixing an iron(III) ion-containing solution with a hexacyanoferrate(II) ion-containing solution or alternatively mixing an iron(Ii) ion-containing solution with a hexacyanoferrate(III) ion-containing solution, and causing Prussian blue to deposit as an insoluble blue precipitate from the solution mixture. The iron(III) ion-containing solution used in such a synthesizing process is, for example, an aqueous solution of iron(III) chloride or iron(III) sulfate, and the hexacyanoferrate(II) ion-containing solution used is, for example, an aqueous solution of potassium hexacyanoferrate(II) or sodium hexacyanoferrate(II). In the alternative process an iron(II) ion-containing solution and a hexacyanoferrate(III) ion-containing solution are used in combination, examples of the former are aqueous solutions of iron(II) chloride and iron(II) sulfate, and an examples of the latter are aqueous solutions of potassium hexacyanoferrate(III) and sodium hexacyanoferrate(III). Whichever combination is used in these prior art processes, it is very difficult to externally control the rate of reaction to a desired level in synthesizing iron(III) hexacyanoferrate(II), because as soon as two different solutions are mixed, chemical reaction takes place very rapidly in the solution mixture. Further, it is impossible to deposit and form a thin film of iron(III) hexacyranoferrate(II) complex directly on a substrate, because the reaction of producing iron(III) hexacyanoferrate(II) occurrs simultaneously throughout the solution mixture to form and precipitate insoluble particles of the three-dimensional complex. While it is possible to form an iron(III) hexacyanoferrate(II)-containing coating on a substrate by applying a dispersion of Prussian blue pigment in a suitable paint on the substrate, no process has been available for forming a thin film of iron(III) hexacyanoferrate(II) directly on a substrate.

SUMMARY OF INVENTION

An object of this invention is to provide a solid thin film of iron(III) hexacyanoferrate(II) which is directly formed on an electrode as an electrodeposited layer intimately adhered to its surface.

Another object of the invention is to provide an electrolytic process for the synthesis of iron(III) hexacyanoferrate(II) wherein iron(III) hexacyanoferrate(II) three-dimensional complex is electrolytically produced as a blue deposit on the cathode by subjecting to electrolysis a solution containing iron(III) ion $Fe^{3+}$, and hexacyanoferrate(III) ion, $[Fe(III)(CN)_6]^{3-}$.

An advantage of this invention is that the use of an electrolytic process allows the rate of electrode reaction and the quantity of the reaction product to be readily controlled through electrolytic voltage and current, time and other factors, and it thus becomes very easy to control the rate and quantity of formation of iron(III) hexacyanoferrate(II) which will deposit as a result of electrode reaction. Since the three-dimensional complex of iron(III) hexacyanoferrate(II) can be formed solely on the cathode surface under such conditions as to completely control the rate of deposition, a thin film of iron(III) hexacyanoferrate(II) three-dimensional complex can be formed directly on the surface of an electronically conductive solid body to any desired thickness in a intimately adhering manner.

The process for electrolytically synthesizing iron(III) hexacyanoferrate(II) according to the present invention will be briefly described below.

According to a feature of the present invention, unlike the direct precipitation involved in the prior art processes, an aqueous solution containing iron(III) ion, Fe(III) is mixed with an aqueous solution containing hexacyanoferrate(III) ion, $[Fe(III)(CN)_6]^{3-}$ to form a clear brown solution, as shown in Table 1 and the resulting solution is subjected to electrolysis to synthesize iron(III) hexacyanoferrate(II).

A pair of solid electrodes are immersed in this clear brown solution. One of the electrodes acts as a cathode on the surface of which a uniform contiguous film of iron(III) hexacyanoferrate(II) is formed according to the present invention, and the other electrode acts as an anode or counter electrode for supplying current to the cathode. When it is intended to operate a cell having the above-mentioned electrodes arranged therein by galvanostatic electrolysis to synthesize a uniform contiguous film of iron(III) hexacyanoferrate(II) on the cathode surface according to the present invention, the electrolysis is preferably effected at a cathode current density between 1 $\mu$A/cm$^2$ and 1 mA/cm$^2$. A film having any desired thickness can be easily obtained by controlling the current density and electrolytic time.

Similarly, when it is intended to operate a cell having the above-mentioned electrodes arranged therein by potentiostatic electrolysis to synthesize a uniform contiguous film of iron(III) hexacyanoferrate(II), a reference electrode is added to the above-mentioned electrode arrangement and used to control the potential of the cathode on which the iron(III) hexacyanoferrate(II) film is to be synthesized, thereby carrying out the potentiostatic electrolysis. For example, when a saturated calomel electrode (S.C.E.) is used as the reference electrode, the cathode potential is set to a level between +0.8 V and −0.2 V with respect to the S.C.E. to carry out electrolysis. A film having any desired thickness can be easily obtained by controlling the electrolytic potential and electrolytic time.

As briefly stated above, the important feature of the present invention resides in that, unlike the prior art processes which produce fine powders of iron(III) hexacyanoferrate(II) as colloidal particles by direct precipitation, electrolysis is effected at a controlled rate of reaction to form a uniform contiguous film of iron(III) hexacyanoferrate(II) and thus its composition can be precisely controlled.

DETAILED DESCRIPTION OF INVENTION

Figure 1:
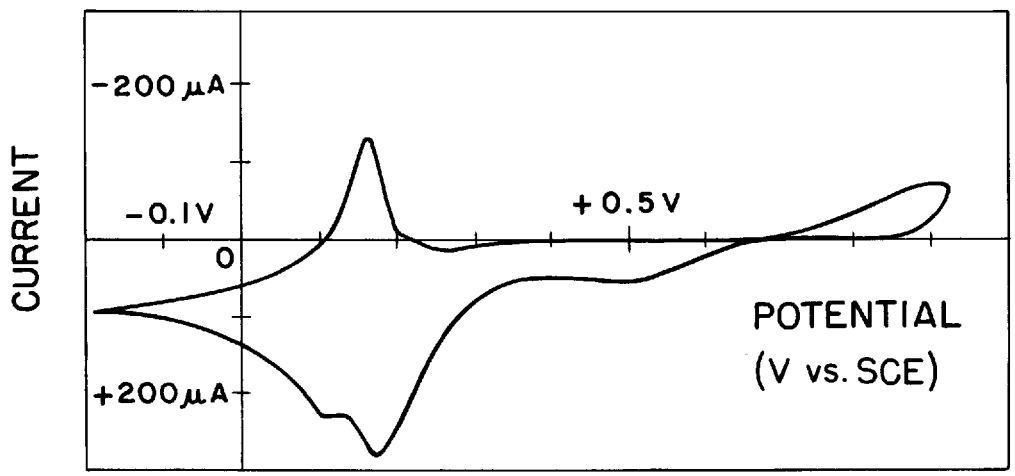
FIG. 1 is a cyclic voltammogram of an aqueous solution mixture of iron(III) chloride and potassium hexacyanoferrate(III) solutions.

It has been believed that the material called Prussian blue consists of a group of the two compounds designated insoluble Prussian blue and soluble Prussian blue based on their synthesizing processes, as shown below.

Water-insoluble Prussian blue: $Fe_4[Fe(CN)_6]_3$
Water-soluble Prussian blue: $KFeFe(CN)_6$ Some recent reports reveal that this difference is due to an analytical error, and they have the same crystalline structure and are essentially the same compound. It is believed that such an analytical problem originates from the fact that the Prussian blue has a substantially loose crystalline structure of zeolitic nature, as evidenced by a lattice constant of 10.2 Å, a lattice spacing of 5.1 Å, and a bottle-neck of 3.5 Å. This zeolitic nature causes considerable adsorption of a variety of molecules and ions, for instance, water or certain organic solvents and alkali metal ions or other metal ions, giving rise to analytical difficulties.

It was difficult to determine the composition of Prussian blue through analysis because in the prior art Prussian blue synthesizing process which comprises mixing an aqueous solution containing Fe(III) ion with an aqueous solution containing $Fe(II)(CN)_6^{4-}$, the reaction comes to completion instantaneously after mixing of the two solutions. The end product, that is, Prussian blue, which precipitates as very small crystals of a difficultly soluble salt, tends to form a colloidal solution and as a result, it apparently adsorbs more molecules and ions because of its increased surface area.

According to the electrolytic synthesizing process of the present invention, iron(III) hexacyanoferrate(II) can be synthesized as a uniform contiguous film having a definite composition.

The iron(III) ion-containing solutions which can be used in the practice of this invention include solutions having one compound or two or more compounds dissolved therein which are selected from the group consisting of iron(III) salts of inorganic acids such as iron(III) chloride, iron(III) sulfate, iron(III) perchlorate, iron(III) nitrate, iron(III) phosphate, iron(III) pyrophosphate, etc.; iron(III) salts of organic acids such as iron(III) oxalate, iron(III) acetate, iron(III) citrate, iron(III) lactate, iron(III) tartrate, etc. and iron(III) ammonium double salts such as iron(III) ammonium sulfate, iron(III) ammonium oxalate, iron(III) ammonium citrate, etc. It will be readily understood that any desired compound may generally be used to form the iron(III) ion-containing solution required for this invention as long as it can dissociate iron(III) ion in the solution.

The hexacyanoferrate(III) ion-containing solutions which can be used in the practice of this invention include solutions having a compound dissolved therein which is selected from the group consisting of hexacyanoferrate(III) such as potassium hexacyanoferrate(III), sodium hexacyanoferrate(III), lithium hexacyanoferrate(III), rubidium hexacyanoferrate (III), ammonium hexacyanoferrate(III), etc. It will be readily understood that any desired such compound may generally be used to form the hexacyanoferrate(III) ion-containing solution required for this invention as long as it can provide hexacyanoferrate(III) ion in the solution.

The iron(III) ion-containing solution and the hexacyanoferrate(III) ion-containing solution as described above ray preferably be prepared separately before they are mixed into a solution mixture ready for use, because the solutions of hexacyanoferrates(III) generally tend to decompose in the presence of light or oxygen and such tendency is enhanced by the coexistence of iron(III) ion in the solution. To any one or all of the iron(III) ion-containing solution, the hexacyanoferrate(III) ion-containing solution, and the solution mixture of these two solutions may be added at least one compound selected from the group consisting of inorganic and organic acids such as hydrochloric acid, sulfuric acid, perchloric acid, nitric acid, phosphoric acid, pyrophosphoric acid, hexafluorophosphoric acid, boric acid, tetrafluorophosphoric acid, carbonic acid, oxalic acid, acetic acid, citric acid, lactic acid, tartaric acid, phthalic acid, etc., and salts of the foregoing inorganic and organic acids with lithium, sodium, potassium, rubidium, calcium, magnesium, ammonium, tetraalkylammonium, etc, in a dissolved form as a supporting electrolyte for ensuring consistent electrolysis. Such supporting electrolytes are effectively added for the purposes of adjusting the acidity of the solution, increasing the conductivity of the solution and improving the chemical stability of solutes, and it is thus apparent that those compounds which are generally used as supporting electrolytes, pH adjustors and buffers in preparing electrolytic solutions may be utilized.

The solvents which may be used in preparing the iron(III) ion-containing solution and the hexacyanoferrate(III) ion-containing solution as described above is typically water although polar solvents such as acetonitrile, tetrahydrofuran, N,N-dimethylformamide, etc. may also be used. It will be readily understood that any desired solvent may be used as long as the iron(III) ion, hexacyanoferrate(III) ion and optionally, supporting electrolyte are stable in the solvent.

As the material of which the electrodes used in electrolysis are made, in principle, any of those materials which are electronically conductive at least at the surface may be used, for example, metals, carbon, conductive metal oxides, semiconductors, conductive plastic materials, mercury, etc. For the purpose of forming a stable blue thin film of iron(III) hexacyanoferrate(II) three-dimensional complex intimately adhered to the cathode surface, at least the cathode electrode of a pair of electrodes is made of a solid which is an inert metal such as platinum, gold, silver, rhodium, palladium, ruthenium, stainless steel, etc., or carbon, or a conductive metal oxide such as tin oxide, indium oxide, cadmium oxide, antimony oxide, etc., or a semiconductor, or another solid body of a base metal or ceramic, glass or plastic material which is coated at least on the surface with the foregoing inert metal, carbon, conductive metal oxide or semiconductor.

The electrolysis may be either potentiostatic or galvanostatic electrolysis.

In potentiostatic electrolysis, a pair of electrodes as described above are immersed in the solution mixture of the iron(III) ion-containing solution and the hexacyanoferrate (III) ion-containing solution as described above, a reference electrode, for example, a saturated calomel electrode-which is ordinarily used in electrochemical cells is provided, and controlled electrolysis is effected in such a way that the polarization potential of the cathode of a pair of electrodes is kept constant with respect to the reference electrode. Iron(III) hexacyanoferrate(II) can be deposited at any polarization potential of the cathode as long as the cathode is polarized so as to be negative with respect to the counter electrode. Particularly when it is intended to deposit an intimately adhering, stable, thin film of the three-dimensional complex, controlled electrolysis is preferably effected in such a way that the polarization potential of the cathode is kept constant in the range from about –0.2 V to about +0.8 V with respect to the saturated calomel electrode. Although iron(III) hexacyanoferrate(II) can be synthesized at cathode potentials out of the range between –0.2 V and +0.8 V, a film of deteriorated adhesion will deposit at a reduced current efficiency.

In galvanostatic electrolysis, controlled electrolysis is effected by supplying such current between a pair of the electrodes described above that a constant current density develops at the cathode. When it is intended to form a firmly adhering thin film of iron(III) hexacyanoferrate(II) complex consistent, it is necessary to set the current value within a range not exceeding the limit above which the electrode potential would widely vary during the electrolysis. If the supply current exceeds the limit, a sudden drop of the electrode potential would occur in the progress of electrolysis, and a film which poorly adheres to the electrode surface will deposit at a reduced electrolysis efficiency under such conditions. Preferably the electrolytic current density is kept constant between 1 $\mu$A/cm.$^2$ and 1 mA/cm.$^2$ in terms of the surface area of the cathode electrode.

Irrespective of the choice between potentiostatic electrolysis and galvanostatic electrolysis, the rate of deposition of iron(III) hexacyanoferrate(II) synthesized on the cathode is proportional to the cathode current. Further, the quantity of iron(III) hexacyanoferrate(II) synthesized is proportional to the quantity of charge through the cathode.

In the case of potentiostatic electrolysis, current the can be varied in accordance with the voltage. Thus, the rate of deposition may be readily controlled indirectly by controlling the cathode potential and the quantity of deposition may be monitored by means of a coulometer. In the case of galvanostatic electrolysis, the rate of deposition may be directly controlled by setting a constant current value and the quantity of deposition may be arbitrarily controlled simply by determining the electrolytic time.

It is preferable in the practice of this invention to adjust the concentrations of iron(III) ion and hexacyanoferrate(III) ion and the pH of the solution mixture to ranges sufficient to provide for practically acceptable stability. It has been found that iron(III) hexacyanoferrate(II) can be synthesized as a stable deposit when both the iron(III) ion and hexacyanoferrate(III) ion are present at concentrations of not less than 5 millimoles/liter in the solution mixture. It has also been found that the upper limits of the concentrations are indefinite for both the iron(III) ion and hexacyanoferrate (III) ion and they may be present in the solution mixture up to the concentrations of saturation. The pH of the solution mixture is critical, and the pH range from 0.3 to 5 has been found satisfactory to form improved deposits. Strongly acidic solution mixtures having a pH of lower than 0.2 will result in a reduced current efficiency and formation of brittle deposits, whereas neutral or alkaline solution mixtures having a pH of higher than 5 will result in unsatisfactory deposits because iron hydroxide contaminant is codeposited in the iron(III) hexacyanoferrate(II) deposit on the cathode.

The invention will be further illustrated by referring to the following examples.

EXAMPLE 1

An aqueous solution containing iron(III) chloride (FeCl$_3$) at a concentration of 25 millimoles/liter was used as the iron(III) ion-containing solution; an aqueous solution containing sodium hexacyanoferrate(III) (Na$_3$Fe(CN)$_6$) at a concentration of 25 millimoles/liter was used as the hexacyanoferrate(III) ion-containing solution, and these two aqueous solutions were mixed in equal volumes to prepare a clear brown solution mixture.

Two electrodes, that is, a working electrode in the form of a platinum plate having a surface area of 0.1 cm$^2$ and a counter electrode in the form of a platinum plate having a surface area of 10 cm$^2$ were immersed in the above-prepared brown solution mixture to provide an electrolytic cell where electrolysis was then effected.

Galvanostatic electrolysis was effected at a current density of 50 $\mu$A/cm$^2$ with the working electrode acting as the cathode, depositing a blue insoluble electrolytic product on the surface of the working electrode.

EXAMPLE 2

An aqueous solution containing iron(III) sulfate ($Fe_2(SO_4)_3$) at a concentration of 25 millimoles/liter was used as the iron(III) ion-containing solution; an aqueous solution containing sodium hexacyanoferrate(III) ($Na_3Fe(CN)_6$) was used as the hexacyanoferrate(III) ion-containing solution, and these two solutions were mixed in equal volumes to prepare a clear brown solution mixture.

Thereafter, cathodic galvanostatic electrolysis was effected at a current density of 50 $\mu A/cm^2$ in the same manner as described in Example 1, depositing a blue insoluble electrolytic product on the surface of the working electrode.

EXAMPLE 3

An aqueous solution containing iron(III) perchlorate ($Fe(ClO_4)_3$) at a concentration of 25 millimoles/liter as the iron(III) ion-containing solution and an aqueous solution containing potassium hexacyanoferrate(III) ($K_3Fe(CN)_6$) at a concentration of 25 millimoles/liter as the hexacyanoferrate(III) ion-containing solution were mixed in equal volumes to prepare a clear brown solution mixture.

Thereafter, cathodic galvanostatic electrolysis was effected in accordance with the same procedure as described in Example 1, depositing a blue insoluble electrolytic product on the surface of the working electrode.

EXAMPLE 4

Equal volume mixing of an aqueous solution containing iron(III) chloride ($FeCl_3$) at a concentration of 25 millimoles/liter as the iron(III) ion-containing solution and an aqueous solution containing potassium hexacyanoferrate (III) ($K_3Fe(CN)_6$) at a concentration of 25 millimoles/liter as the hexacyanoferrate(III) ion-containing solution also resulted in a clear brown solution mixture.

Thereafter, electrolysis was effected in accordance with the same procedure as described in Example 1, depositing a blue insoluble electrolytic product on the surface of the working electrode.

EXAMPLE 5

To a mixture of an aqueous solution containing iron(III) chloride ($FeCl_3$) at a concentration of 50 millimoles/liter as the iron(III) ion-containing solution and an aqueous solution containing potasssium hexacyanoferrate(III) ($K_3Fe(CN)_6$) as the hexacyanoferrate(III) ion-containing solution in equal volumes, was added another aqueous solution containing potassium chloride (KC1) at a concentration of 1 mole/liter in a volume equal to that of the previously prepared mixture. There was obtained a clear brown solution mixture.

Thereafter, electrolysis was effected in accordance with the same procedure as described in Example 1, depositing a blue insoluble electrolytic product on the working electrode.

EXAMPLE 6

An aqueous solution prepared by dissolving 25 millimoles/liter of iron(III) sulfate ($Fe_2(SO_4)_3$) in water and adding sulfuric acid ($H_2SO_4$) thereto to adjust the acid concentration to 0.01N was used as the iron(III) ion-containing solution, an aqueous solution prepared by dissolving 25 millimoles/liter of sodium hexacyanoferrate(III) ($Na_3Fe(CN)_6$) in water and adding sulfuric acid thereto to adjust the acid concentration to 0.01N was used as the hexacyanoferrate(III) ion-containing solution, and these solutions were mixed in equal volumes to prepare a clear brown solution mixture.

Thereafter, electrolysis was effected in accordance with the same procedure as described in Example 1, depositing a blue insoluble electrolytic product on the surface of the working electrode.

EXAMPLE 7

An aqueous solution prepared by dissolving 25 millimoles/liter of iron(III) chloride in water and adjusting the pH value thereof to 2.0 with a buffer solution "Clark-Lubs" was used as the iron(III) ion-containing solution, an aqueous solution prepared by dissolving 25 millimoles/liter of potassium hexacyanoferrate(III) in water and adjusting the pH value to 2.0 with a buffer solution "Clark-Lubs" was used as the hexacyanoferrate(III) ion-containing solution, and these solutions were mixed in equal volumes to prepare a clear brown solution mixture.

Thereafter, electrolysis was effected in accordance with the same procedure as described in Example 1, depositing a blue insoluble electrolytic product on the surface of the working electrode.

EXAMPLE 8

A solution prepared by dissolving 100 millimoles/liter of iron(III) chloride in aqueous hydrochloric acid having an acid concentration of 0.1N was used as the iron(III) ion-containing solution, a solution prepared by dissolving 100 millimoles/liter of potassium hexacyanoferrate(III) in 0.1N aqueous hydrochloric acid was used as the hexacyanoferrate (III) ion-containing solution, and these solutions were mixed to prepare a clear brown solution mixture.

Thereafter, electrolysis was effected in accordance with the same procedure as described in Example 1, depositing a blue insoluble electrolytic product on the surface of the working electrode.

As seen from the foregoing Examples 1–8, when solution mixtures of the iron(III) ion-containing solution and the hexacyanoferrate(III) ion-containing solution were prepared by using solutions having various iron(III) salts dissolved and solutions having various hexacyanoferrate(III) salts dissolved, and optionally, further adding thereto another acid or salt, all these solution mixtures became similar clear brown solutions. Cathodic electrolysis using these solution mixtures as the electrolytic solution always resulted in blue insoluble electrolytic products deposited on the surface of the working electrode.

Every solution mixture containing both iron(III) ion and hexacyanoferrate(III) ion becomes a clear brown solution because these ions reach chemical equilibrium in the solution mixture, which is represented by the following equation (1):

$$Fe^{3+} + Fe(III)(CN)_6^{3-} \leftrightarrows Fe(III)Fe(III)(CN)_6 \qquad (1)$$

The brown color of the solution mixtures is attributable to the absorption by the $Fe(III)Fe(III)(CN)_6$ complex appearing on the right-hand side of formula (1).

When the brown solution mixture containing iron(III) ion and hexacyanoferrate(III) ion as the electrolytic solution is subjected to electrolysis, a blue insoluble deposit is formed on the cathode surface, which has been believed to be the electrolytic product resulting from the following reaction illustrated by equation (2) or (3):

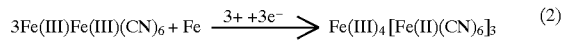

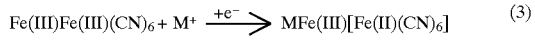

In equation (3), $M^+$ is a metal ion other than Fe ion present in the electrolytic solution. The electrolytic products resulting from equations (2) or (3) are insoluble complexes of iron(III) hexacyanoferrate(II) which are known as water-insoluble Prussian blue or water-soluble Prussian blue, respectively.

In order to demonstrate whether the electrolytic product formed on the cathode by the electrolysis of the brown solution mixture containing iron(III) ion and hexacyanoferrate (III) ion is the iron(III) hexacyanoferrate(II) attributable to the reactions of equations (1), and (2), or (1) and (3), Examples 9 and 10 are set forth below.

EXAMPLE 9

The electrolytic solution used in this example was a clear brown solution mixture as used in Example 8. Three electrodes, a working electrode in the form of a platinum plate having an area of 0.1 cm$^2$, a counter electrode in the form of a platinum plate having an area of 10 cm$^2$, and a reference electrode in the form of a saturated calomel electrode were immersed in the solution mixture to provide an electrolytic cell. A potentiostat was used as an electric power source for electrolysis.

1) Electrolysis was carried out by cyclic voltammetry with the voltage varying at a scanning rate of 50 millivolts/sec. with respect to the working electrode. As long as the potential of the working electrode was +0.8 V or more negative with respect to the reference electrode, a blue insoluble electrolytic product deposited on the surface of the working electrode, which was similar to those obtained in Examples 1 & 8. The cyclic voltammogram is shown in FIG. 1.

As seen from FIG. 1, a new waveform developed at potentials from about 0.8 V to about 0.5 V, which is different from those waveforms due to reduction of iron(III) ion and reduction of hexacyanoferrate(III) ion.

2) Next, four brown solution mixtures having different concentrations of iron.(III) ion and hexacyanoferrate(III) ion were prepared by diluting the electrolytic solution used in the foregoing procedure 1) with 0.1N hydrochloric acid. These solution mixtures are equal in acid concentration and the concentration of the Fe(III)Fe(III)(CN)$_6$ complex in the solution mixtures depends on the concentrations of the iron(III) ion and hexacyanoferrate(III) ion in accordance with equilibrium equation (1). The absorption at a wave length of 500 nm is solely attributable to the Fe(III)Fe(III)(CN)$_6$ complex. Thus, the absorbances of the four solution mixtures were determined at a wave length of 500 nm. The results proved that the absorbance was proportional to the concentration of the solution mixtures.

Figure 2:
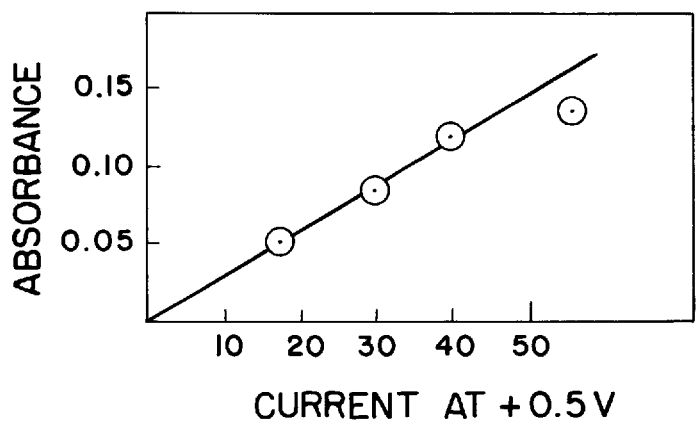
FIG. 2 is a graph showing the relationship of electrolytic current at an electrolytic potential of 0.5 V (vs. SCE) to the absorbance of an electrolytic solution at a wave length of 500 nm when the concentration of the electrolytic solution is varied.

Using the thus prepared four brown solution mixtures having different concentrations, cyclic voltammetry was carried out in the same manner as in the foregoing procedure 1). As in the foregoing procedure 1), a blue insoluble deposit was observed at working electrode potentials which were more negative than 0.8 V with respect to the reference electrode for all the four solution mixtures having different concentrations. For each of the solution mixtures having different concentrations, the electrolytic current was determined at a potential of the working electrode of 0.5 V with respect to the reference electrode. FIG. 2 shows the thus obtained current values in relation to the absorbance of the solution mixture of the corresponding concentration: at a wave length of 500 nm. As seen from FIG. 2, the electrolytic current at a potential of 0.5 V is proportional to the absorbance at a wave length of 500 nm, that is, the concentration of the Fe(III)Fe(III)(CN)$_6$ complex.

The results of the foregoing procedures 1) and 2) reveal that formation of insoluble blue deposits on the surface of the working electrode is by the electrolytic reduction of the Fe(III)Fe(III)(CN)$_6$ complex at potentials from about 0.8 V to about 0.4 V with respect to the reference electrode.

Next, Example 10 was carried out in order to demonstrate that the insoluble deposit formed on the surface of the working electrode is Prussian blue.

EXAMPLE 10

The electrolytic solution used in this example was also a clear brown solution mixture as used in Example 8. Two electrodes, a working electrode in the form of a glass substrate coated with a transparent conductive layer of tin oxide having an area of 1.0 cm$^2$ and a counter electrode in the form of a platinum plate having an area of 10 cm$^2$ were immersed in the solution mixture to provide an electrolytic cell.

Galvanostatic electrolysis was effected for 2 minutes at a current of 50 $\mu$A with the working electrode acting as the cathode. A blue insoluble electrolytic product was deposited as a thin film intimately adhered to the surface of the transparent tin oxide electrode as in Examples 1–10.

Figure 3:
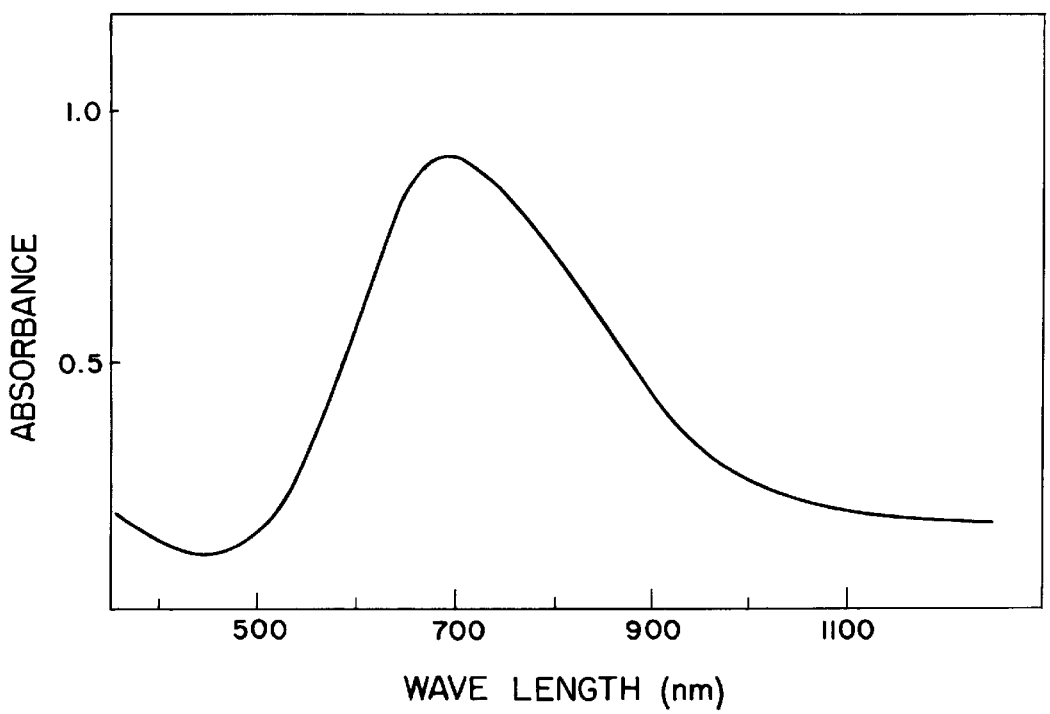
FIG. 3 is an absorption spectrum-wave length diagram of iron(III) hexacyanoferrate(II) obtained by the process of this invention.

The transparent tin oxide electrode having the electrolytic product deposited thereon was removed from the cell, rinsed, dried, and then examined by means of a spectrophotometer to determine the optical absorption spectrum. The result is shown in FIG. 3. The absorption spectrum of a colloidal dispersion of Prussian blue pigment or iron(III) hexacyanoferrate(II) which is chemically synthesized by any of the conventional processes has an absorption maximum at a wave length of about 680 nm. As seen from FIG. 3, the blue layer formed on the tin oxide surface in this example also exhibited a similar absorption maximum at about 680 nm.

The result of Example 10 proves that the deposit formed as a blue insoluble electrolytic product on the cathode surface by the synthesizing process of this invention is iron(III) hexacyanoferrate(II) generally known as Prussian blue pigment, Next Example 11 was carried out to determine whether the blue deposit is, $K^+$ ion-containing soluble Prussian blue or $K^+$ ion-tree insoluble Prussian blue.

EXAMPLE 11

A clear brown solution was used as in Example 8: a cathode in the form of a platinum plate having an area of 10 cm$^2$, on the surface of which iron(III) hexacyanoferrate(II) is to be synthesized and an anode in the form of a platinum plate having an area of about 100 cm$^2$ were immersed in the solution. With a current density of 20 $\mu$A/cm$^2$ at the platinum plate cathode electrode, galvanostatic electrolysis is effected for about 8 minutes. At the end of electrolysis, a blue, uniform, contiguous film was deposited on the platinum plate cathode electrode.

Next, the composition of the blue film deposited on the platinum plate cathode electrode is described.

Chemical analyses were employed to determine the composition. In particularly, the amount of iron atoms was analyzed quantitatively by atomic absorption analysis and the amount of potassium ions was analyzed quantitatively flame spectrochemical analysis. In addition, the quantity of iron(III) involved in the oxidation-reduction reaction represented by the following equation was determined by means of a coulometer. The composition of the blue deposit film was thus determined through a combination of chemical analyses and the quantitative measurement of electrochemical electricity.

The electrochemical measurement aims at deciding which electrochemical reaction from the following equations (4) or (5) corresponds to the oxidation-reduction reaction which takes place in the formation of the blue deposit. Depending on whether the blue deposit is insoluble Prussian blue or soluble Prussian blue, the quantity of electricity required for oxidation-reduction differs.

Insoluble Prussian blue

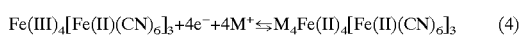

$$Fe(III)_4[Fe(II)(CN)_6]_3 + 4e^- + 4M^+ \rightleftharpoons M_4Fe(II)_4[Fe(II)(CN)_6]_3 \quad (4)$$

Soluble Prussian blue

$$KFe(III)[Fe(II)(CN)_6] + e^- + M^+ \rightleftharpoons MKFe(II)[Fe(II)(CN)_6] \quad (5)$$

In the above formulas, $M^+$ is an alkali metal ion such as $K^+$.

It is apparent that the ratio of the number of iron atoms identified by the atomic absorption analysis to the number (n) of iron atoms identified by the quantitative measurement of electricity is 7:4 in the case of insoluble Prussian blue and 2:1 in the case of soluble Prussian blue.

The results are shown in Table 2. The measured value ($\mu$g) of iron atoms obtained by the atomic absorption analysis is shown with respect to the quantity of electricity (mC) required for oxidation-reduction, as well as the measured value of potassium atoms obtained by the flame spectrochemical analysis. Experimental values are shown in comparison with calculated values for both cases.

TABLE 2

|    | Found | Calculated for $Fe_4[Fe(CN)_6]_3$ | Calculated for $KFe[Fe(CN)_6]$ |
|----|-------|-----------------------------------|--------------------------------|
| Fe | 1.02  | 1.01                              | 1.16                           |
| K  | 0.06  | 0                                 | 0.41                           | unit: ug/mC

As seen from Table 2, the iron(III) hexacyanoferrate(II) synthesized by process of the present invention has the composition:

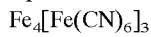

$Fe_4[Fe(CN)_6]_3$

As for the composition of the electrode used in electrolytic synthesis according to this invention as understood from equations (1), (2) and (4), any desired material may, in principle, be used to synthesize iron(III) hexacyanoferrate (II) as long as at least the surface of the electrode is electronically conductive. In order to prevent the iron(III) hexacyanoferrate(II) formed from being contaminated with impurities as a result of side reaction of the electrode itself, which would take place during electrolysis, a preferred choice is an electrode which is formed with an inert material, such as an inert metal, carbon or a conductive metal oxide at least on the surface. Platinum is used to form the electrode as a typical example of the inert metal in Examples 1–9 and a tin oxide electrode is used as a typical example of the metal oxide in Examples 10–11. A carbon electrode is used as another example of the electrode-forming material in Example 12 to be described below.

EXAMPLE 12

The electrolytic solution used in this example was a clear brown solution mixture as used in Example 1.

Two electrodes, a working electrode in the form of a glassy carbon electrode having a surface area of 0.1 cm² and a counter electrode in the form of a graphite electrode having a surface area of 10 cm² were immersed in the solution mixture. With the working electrode acting as the cathode, galvanostatic electrolysis was effected for 2 minutes at a current density of 50 $\mu$A/cm².

As in the foregoing Examples 1–10, a blue insoluble electrolytic product deposited on the surface of the working electrode or glassy carbon electrode.

A choice of the electrolytic method may be made between galvanostatic and potentiostatic electrolysis to synthesize iron(III) hexacyanoferrate(II) on the surface of the working electrode according to this invention, as long as electrolysis is effected in such a way that the working electrode is polarized negatively with respect to the counter electrode.

However, electrolysis should be effected at a limited electrolytic potential in order to efficiently form iron(III) hexacyanoferrate(II) as a thin film intimately adhered to the surface of the working electrode. To determine an appropriate range for the electrolytic potential under electrolysis, Example 13 and 14 were carried out.

EXAMPLE 13

A solution prepared by dissolving 20 millimoles/liter of iron(III) chloride ($FeCl_3$) in 0.1N hydrochloric acid was used as the iron(III) ion-containing solution; a solution prepared by dissolving 20 millimoles/liter of potassium hexacyanoferrate(III) ($K_3Fe(III)(CN)_6$) in 0.1N hydrochloric acid was used as the hexacyanoferrate(III) ion-containing solution, and they were mixed to prepare a clear brown solution mixture.

A working electrode in the form of a platinum electrode having an area of 0.1 cm², a counter electrode in the form of a platinum electrode having an area of 10 cm², and a reference electrode in the form of a saturated calomel electrode were immersed in the above-prepared solution mixture to provide an electrolytic cell. A potentiostat was used as an electric power source for electrolysis.

Potentiostatic electrolysis was effected while the potential of the wording electrode was progressively varied from +1.0 V to the negative with respect to the reference electrode. A blue electrolytic product similar to those obtained in Examples 1–11 began to deposit on the working electrode surface at a potential of about +0.8 V, and the formation of iron(III) hexacyanoferrate(II) as a blue deposit was observed at potentials in the range between +0.8 V and −0.2 V.

Figure 4:
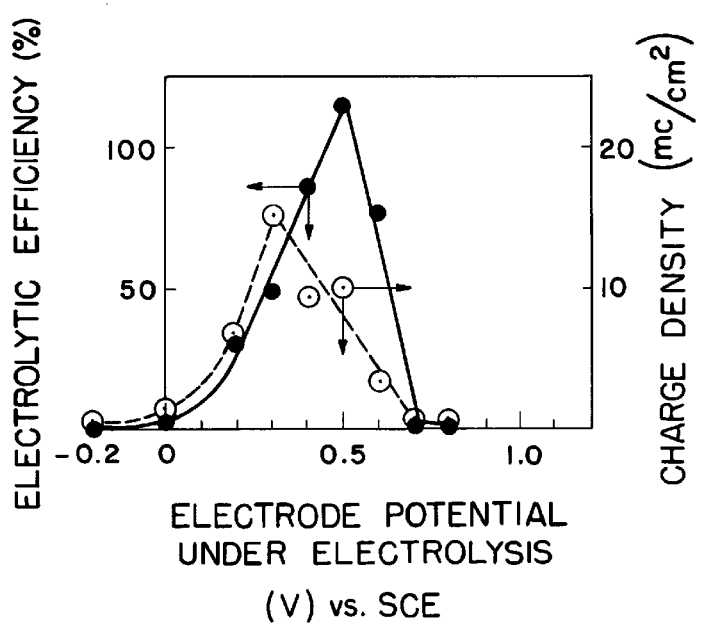
FIG. 4 is a graph showing the relationship of the electrolytic potential under potentiostatic electrolysis to the electrolytic efficiency and charge density of deposits.

Potentiostatic electrolysis was effected for 20 seconds at different potentials, and the charge density of the iron(III) hexacyanoferrate(II) deposit on the working electrode surface was measured as well as the electrolytic efficiency. The results are plotted in the graph of FIG. 4. As seen from FIG. 4, the electrolytic efficiency in synthesizing iron(III) hexacyanoferrate(II) is maximum when potentiostatic electrolysis is effected at a limited potential or about 0.5 V with respect to the saturated calomel electrode.

The iron(III) hexacyanoferrate(II) layers deposited on the working electrode at different potentials were determined for adhesion to the electrode surface by performing a peel test using an adhesive cellophane tape. Good adhesion was found for the layers formed at potentials from about +0.8 V to about +0.4 V whereas the layers formed at more negative potentials exhibited poor adhesion.

EXAMPLE 14

An aqueous solution containing iron(III).chloride (FeCl$_3$) at a concentration of 25 millimoles/liter as the iron(III) ion-containing solution and an aqueous solution containing potassium hexacyanoferrate(III) at a concentration of 25 millimoles/liter as the hexacyanoferrate(III) ion-containing solution were mixed in equal volumes to prepare a clear brown electrolytic solution. A working electrode, a counter electrode and a reference electrode as used in Example 12 were immersed in the electrolytic solution, and the cell was operated with a potentiostat.

Figure 5:
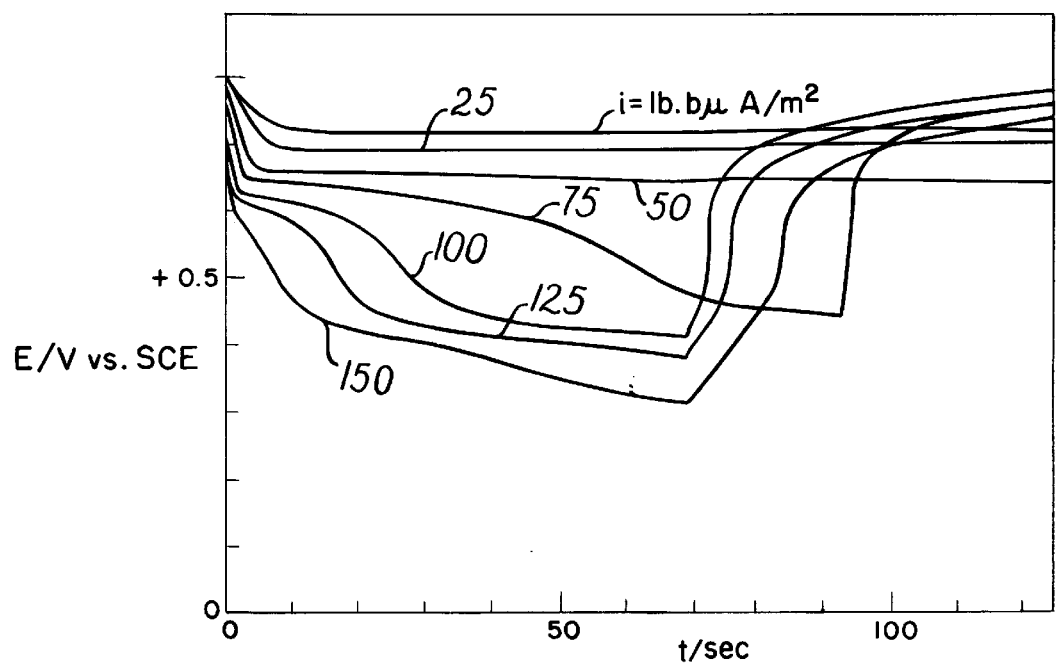
FIG. 5 is a graph showing the variation of electrolytic potential with time when galvanostatic electrolysis is effected at different current densities while the concentration of an electrolytic solution is fixed.

With the working electrode acting as the cathode, galvanostatic electrolysis was effected for 70 seconds or more at different current densities. The potential of the working electrode under electrolysis at the different current densities was measured with respect to the reference electrode to monitor its variation with time. The result of measurement is shown in FIG. 5. As seen from FIG. 5, the potential of the working electrode under electrolysis is kept within the range between 0.5 V and 0.8 V with respect to the reference electrode throughout the entire electrolytic time at current densities of lower than 50 $\mu$A/cm$^2$ (inclusive). In electrolysis at current densities higher than 75 $\mu$A/cm$^2$ (inclusive), however, the potential of the working electrode changed to a value more negative than 0.5 V from an intermediate point of time.

Next, the iron(III) hexacyanoferrate(II) layers formed on the working electrode at different current, densities were determined for adhesion to the electrode surface by performing a peel test using an adhesive cellophane tape. Good adhesion was found for the layers formed by galvanostatic electrolysis at a potential of the working electrode in the range between 0.8 V and 0.5 V, whereas the layers formed at current densities causing the potential to change to a value more negative than 0.5 V exhibited poor adhesion.

As apparent from Examples 13 and 14, potentiostatic electrolysis wherein the electrode potential is always kept within the range from about 0.8 V to about 0.5 V with respect to the saturated calomel electrode, or galvanostatic electrolysis wherein the electrode potential does not change to a value less than 0.5 V with respect to the saturated calomel electrode during electrolysis may preferably be employed to synthesize iron(III) hexacyanoferrate(II) according to this invention in order to form an intimately adhering deposit on the electrode surface at increased efficiency.

It has been found that iron(III) hexacyanoferrate(II) can be deposited by electrolysis as long as both the concentration of iron(III) ion and the concentration of hexacyanoferrate(III) ion in the electrolytic solution are not less than 5 millimoles/liter. In the case of synthesis by potentiostatic electrolysis, a layer of iron(III) hexacyanoferrate(II) can be formed as an insoluble deposit intimately adhering to the electrode surface, by effecting electrolysis at limited electrode potentials in the range between about 0.8 V and about 0.5 V with respect to the saturated calomel electrode, when both the ions are present at concentrations of not less than 5 millimoles/liter in the electrolytic solution. On the other hand, when it is intended to deposit an intimately adhering layer on the electrode surface by galvanostatic electrolysis, the electrolytic solution should be prepared at such concentrations that the electrode potential may always be kept in the range from 0.5 V to 0.8 V with respect to the saturated calomel electrode and a constant current may be held. Example 15 illustrates how the electrode potential will vary when electrolytic solutions of different concentrations are subjected to galvanostatic electrolysis.

EXAMPLE 15

A clear brown solution mixture which was essentially the same as prepared in Example 13 and contained equal concentrations of iron(III) ion and hexacyanoferrate(II) ion was used. This solution mixture was diluted with water to prepare five electrolytic solutions which contained both the iron(III) ion and the hexacyanoferrate(III) ion at different concentrations of 25, 16, 12.5, 10 and 5 millimoles/liter. A working electrode, a counter electrode and a reference electrode as used in Example 13 were connected to a potentiostat. With the working electrode acting as the cathode, galvanostatic electrolysis was effected at a current density of 50 $\mu$A/cm$^2$ while the potential of the working elctrode with respect to the saturated calomel electrode was measured during electrolysis to monitor its variation. The result of measurement is shown in FIG. 6.

Figure 6:
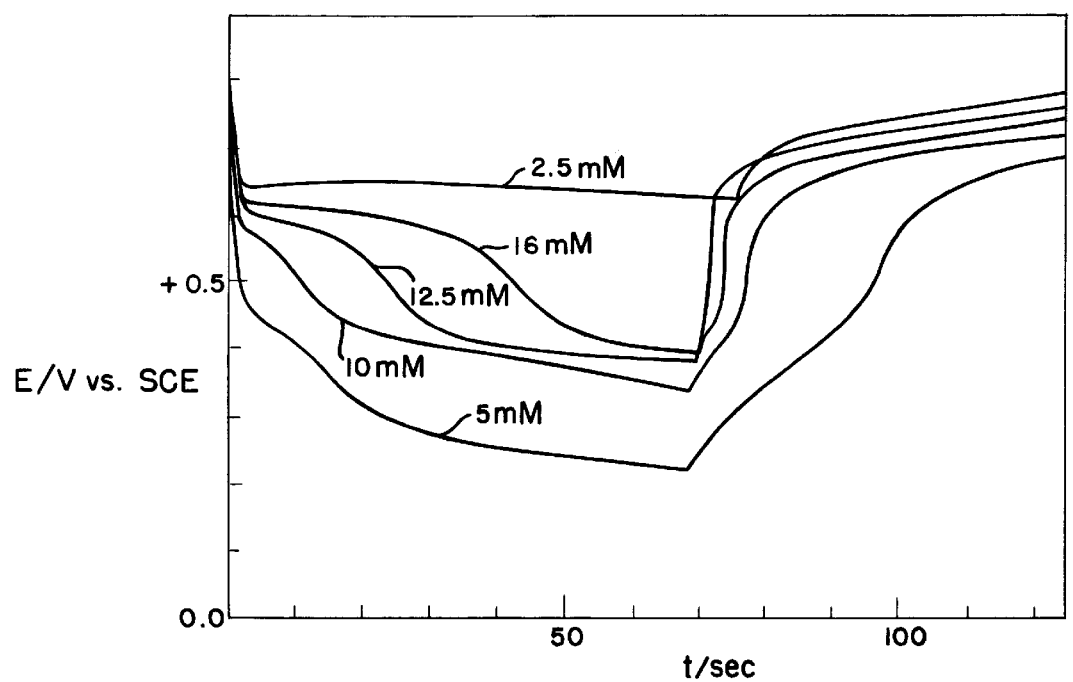
FIG. 6 is a graph showing the variation of electrode potential with time when the concentration of an electrolytic solution is varied at a fixed current density.

As seen from FIG. 6, the potential of the working electrode is always kept at a constant level in the range from about 0.8 V to about 0.5 V with respect to the saturated calomel electrode during electrolysis when both the ions are present at concentrations of not less than 25 millimoles/liter in electrolytic solutions, whereas the working electrode potential changes to a level more negative than 0.5 V in the progress of electrolysis when both the ions are present at concentrations of lower than 25 millimoles/liter in electrolytic solutions.

Next, the iron(III) hexacyanoferrate(II) deposited on the working electrode from electrolytic solutions of different concentrations was determined for adhesion to the electrode surface by performing a peel test using an adhesive cellophane tape. Good adhesion was found for the layers of iron(III) hexacynoferrate(II) deposited from electrolytic solutions of sufficient concentrations to keep the electrode potential in the range of 0.8 V to 0.5 V during electrolysis, whereas electrolytic solutions of concentrations at which the electrode potential would change to a value more negative than 0.5 V resulted in poor adhesion.

It was found in Example 15 that a layer of iron(III) hexacyanoferrate(II) could be deposited as an insoluble film intimately adhering to the electrode surface when electrolysis was effected under the condition that the electrode potential under electrolysis is kept within the range from about 0.8 V to about 0.5 V with respect to the saturated calomel electrode, as in Examples 13 and 14. As seen from Examples 14 and 15, to form an intimately adhering film on the electrode surface by galvanostatic electrolysis, the electrode potential should be always kept in the range from about 0.8 V to about 0.5 V during electrolysis, and for this purpose, a constant current which provides a current density lower than the upper limit defined by the concentration of an electrolytic solution may be provided (Example 14), or alternatively, an electrolytic solution which is prepared at an ion concentration higher than the lower limit defined by a given current density may be used (Example 15).

Differently stated in general expression, to form an iron (III) hexacyanoferrate(II) layer intimately adhering to and covering the electrode surface by galvanostatic electrolysis, the current density and electrolytic solution concentration should be selected so that the electrode potential does not abruptly change to a more negative potential during electrolysis. Although an exact range of the desired electrode potential may slightly vary with the type and concentration of particular iron(III) and hexacyanoferrate(III) salts used, the type and concentration of a particular supporting electrolyte used for pH adjustment or other purposes, or the material of the electrode, the above-described general expression properly defines the range of electrolytic conditions encompassed by this invention.

In all the examples including Examples 1 to 15, for the sake of avoiding complexity of description, the electrolytic solutions used are solution mixtures containing equal concentrations of iron(III) ion and hexacyanoferrate(III) ion.

However, the electrolytic solutions used in this invention need not necessarily contain equal concentrations of iron (III) ion and hexacyanoferrate(III) ion. An electrolytic solution containing different concentrations of the two ions was used in Example 16.

EXAMPLE 16

1) An aqueous solution containing iron(III) chloride at a concentration of 10 millimoles/liter was used as the iron(III) ion-containing solution; an aqueous solution containing potassium hexacyanoferrate(III) at a concentration of 50 millimoles/liter was used as the hexacyanoferrate(III) ion-containing solution, and these solutions were mixed in equal volumes to prepare a clear brown electrolytic solution.

A working electrode in the form of a platinum plate having an area of 0.1 $cm^2$ and a counter electrode in the form of a platinum plate having an area of 10 $cm^2$ were used, and potentiostatic electrolysis was effected in such a way that the working electrode was polarized at 0.5 V with respect to the saturated calomel electrode, forming a layer of iron(III) hexacyanoferrate(II) as a blue, insoluble electrodeposited film on the surface of the working electrode.

2) An aqueous solution containing iron(III) chloride at a concentration of 50 millimoles/liter was used as the iron(III) ion-containing solution, an aqueous solution containing potassium hexacyanoferrate(III) at a concentration of 10 millimoles/liter was used as the hexacyanoferrate(III) ion-containing solution, and these solutions were mixed in equal volumes to prepare a clear brown electrolytic solution.

Potentiostatic electrolysis was effected under the same conditions as described in procedure 1), forming a layer of iron(III) hexacyanoferrate(II) as a blue, insoluble electrodeposited film on the surface of the working electrode as in the former procedure.

As seen from Example 16, no limitation should be imparted to the ratio of concentration of the iron(III) ion to the hexacyanoferrate(III) ion in electrolytic solutions used in the practice of this invention.

In forming an iron(III) hexacyanoferrate(II) layer of high quality as an insoluble electrodeposited film intimately adhering to the electrode surface, the pD value of electrolytic solutions should be regulated to fall in the optimum range before use. When electrolytic solutions have higher pH values in the neutral to alkaline range, the iron(III) ion undergoes hydrolysis and iron hydroxide is thus codeposited in electrodeposited films. With lower pH values in the strongly acidic range, the acid undergoes decomposition, resulting in films of poor adhesion. Example 17 was carried out to find that the optimum pH range for electrolytic solutions is an acidic range of not less than pH 0.3 and not less than pH 5.

EXAMPLE 17

Electrolytic solutions which were essentially the same as used in Example 14 were used except that their pH value was adjusted to twelve different values of pH 0.2, 0.3, 0.5, 0.8, 1.5, 2.0, 3.0, 4.0, 5.0, 6.0, 7.0 and 9.0 with hydrochloric acid and optionally, with 1N potassium hydroxide solution.

These electrolytic solutions having different pH values were subjected to galvanostatic electrolysis for 2 minutes at a current density of 50 $\mu A/cm^2$ using the same electrodes and power source as used in Example 14. Layers of iron(III) hexacyanoferrate(II) were deposited on the surface of the working electrode and their adhesion determined by performing a peel test using an adhesive cellophane tape.

It was found that the layers deposited from those electrolytic solutions having pH values adjusted within the range from pH 0.3 to 5.0 exhibited good adhesion to the electrode surface whereas the layers deposited from those electrolytic solutions having pH values adjusted to 0.2 or higher than 6.0 (inclusive) exhibited poor adhesion.

As illustrated in a number of examples, the process for synthesizing iron(III) hexacyanoferrate(II) according to this invention, which comprises using a solution containing iron(III) ion in admixture with hexacyanoferrate(III) ion as an electrolytic solution, and causing a deposit to form on the cathode surface as a blue insoluble electrolytic product, is of great utility in commercial applications because (1) the synthesis of iron(III) hexacyanoferrate(II) can be carried out by externally controlling the rate of reaction and the quantity of the product formed to any desired values, (2) a layer of iron(III) hexacyanoferrate(II) can be directly formed on the electrode surface as an intimately adhering blue insoluble deposit by appropriately setting electrolytic conditions including the composition and pH range of the electrolytic solution, electrolytic potential and current, and (3) the electrolytic synthesizing process permits iron(III) hexacyanoferrate(II) to form a uniform contiguous film having a precise composition of $Fe_4[Fe(CN)_6]_3$ on a solid electrode, etc.

Application of Iron(III) Hexacyanoferrate(II) Film
1. Electrochromic Display Device Iron(III) hexacyanoferrate(II) film is suitable for an improved novel electrochromic display device.

In general, the iron(III) hexacyanoferrate(II) salt is included in a group of blue pigment compounds known as Prussian blue which are generally classified into two groups of compounds, that is, insoluble Prussian blue and soluble Prussian blue:

$Fe(III)_4[Fe(II)(CN)_6]_3$ insoluble Prussian blue $M^+ Fe(III)[Fe(II)(CN)_6]$ soluble Prussian blue Wherein $M^+$ is a monovalent cation such as $Li^+$, $Na^+$, $K^+$, $Rb^+$, $Cs^+$, $NH_4^+$, etc.

Figure 7A:
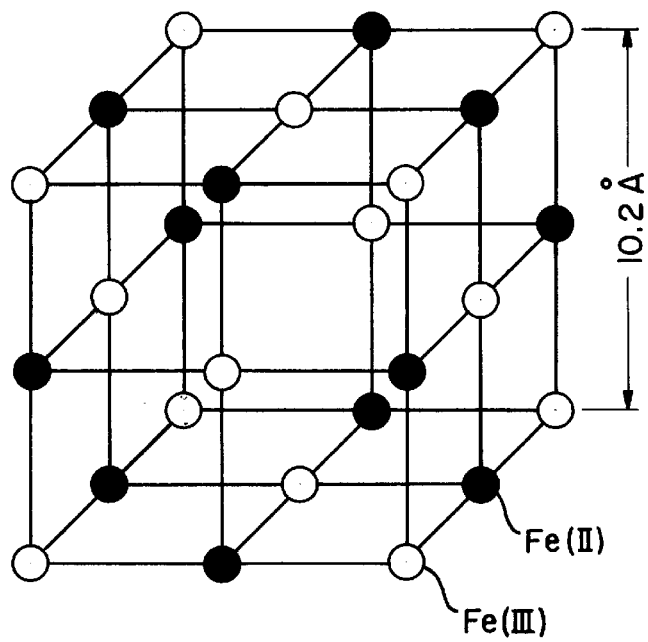
FIG. 7a illustrates the crystal lattice of insoluble blue.
Figure 7B:
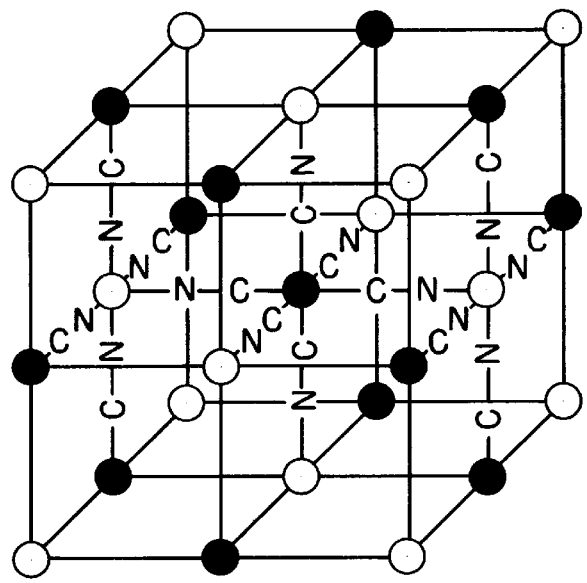
FIG. 7b illustrates the crystal lattice of soluble Prussian blue, in which ● designates Fe(II), ○ designates Fe(III), and the C and N atoms of the cyano group bond with Fe(II) and Fe(III), respectively. Water molecules in the crystal are omitted for simplicity.

FIG. 7(a) and FIG. 7(b) show the crystalline structures of insoluble Prussian blue and soluble Prussian blue, respectively. As apparent from FIG. 7, both insoluble Prussian blue and soluble Prussian blue are mixed valence complexes having a three-dimensional network structure in which a cyano group links Fe(II) and Fe(III). The C atom of the cyano group coordinates with Fe(II) and the N atom of the cyano group coordinates with Fe(III). Iron atoms of different oxidation numbers, that is, Fe(III) an d Fe(II) coexist in a common compound, and for this reason, the compound is called the mixed valence complex. The aesthetic blue color inherent to Prussian blue is attributable to the mixed valence absorption band due to the coexistence of iron atoms of different oxidation numbers in the single compound as described above. If all the Fe(III) atoms in the crystal are reduced into Fe(II), the crystal loses its blue color and becomes colorless while the crystalline structure itself remains unchanged. The present electrochromic display is based on the principle that the valence of Fe(III) in the above-mentioned mixed valence complex is reversibly changed between trivalence and divalence by an electro-chemical oxidation-reduction to change its color, and this reaction may be represented by equation (6) or (6'):

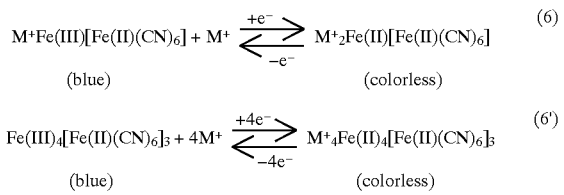

wherein $M^+$ represents a monovalent cation such as $Li^+$, $Na^+$, $K^+$, $Rb^+$, $Cs^+$, $NH_4^+$, etc.

The electrochromic display element having an iron(III) hexacyanoferrate(II) salt incorporated as an electrochromic material utilizes the color change resulting from the electrochemical reaction of a layer of the iron(III) hexacyanoferrate(II) salt previously held on the surface of a display electrode as a continguous uniform thin film of an insoluble mixed valence complex having a three-dimensional network structure. Consequently, the color may be always developed at a given density depending on the thickness of the iron(III) hexacyanoferrate(II) salt layer. Furthermore, as understood from equations (6) and (6'), the reaction is a stoichiometric one-electron or four-electron transfer reaction. The display element of the invention is easy to drive because the quantity of the charge need not be precisely controlled.

The blue pigment known as Prussian blue has no problem of chemical stability, as proved by the fact that it has long been used in a wide variety of applications, for example, in paint and printing ink since its discovery in 1704. By using the iron(III) hexacyanoferrate (II) salt, the present invention provides an electrochromic display element which is easy to drive to develop an aesthetic Prussian blue color at a given density and uses a particular coloring species whose chemical stability has been proved by its traditional usage.

2. Secondary Battery

A synthesized film of iron(III) hexacyanoferrate(II) made by the process disclosed in this specification is applicable to the active material for a secondary battery.

The film electro-deposited on an electrode shows an excellent reversibility for electro-chemical redox cycles within the range of potentials between +0.6 V and –0.2 V vs SCE without any structural deformation of the film.

The following embodiment is the secondary battery wherein the Prussian Blue film has been utilized as the anodic active material.

Figure 8:
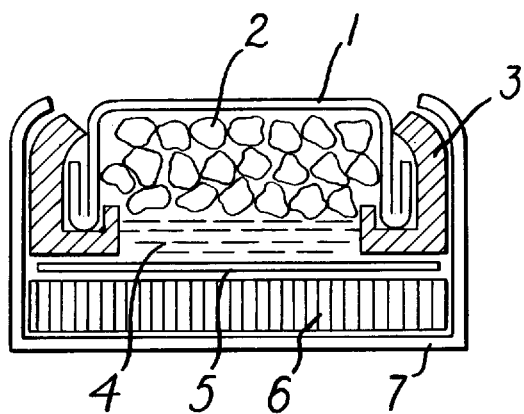
FIG. 8 illustrates a cell construction of the button type of a secondary battery as an application of the present invention.

The construction of the button type battery is shown in FIG. 8, wherein the cathode can 1 partially envelopes the amalgamized zinc granules 2 and packing 3 separates the sides of the cathode can 1 from the anode can 7.

A pellet 6 made of acetylene black mixed with a binder of polyethylene was electro-chemically modified with iron(III) hexacyanoferrate(II) by the process utilized in the example 8 though the working electrode material is not the same as that of the example 8.

The secondary battery includes the pellet 6 which is utilized as the active anode; the amalgamized zinc granules 2 are used as the active cathode and a $1M-NH_4Cl$ solution 4 which penetrates a cellophane paper 5 are used as the electrolyte 4 and a separator.

Figure 9:
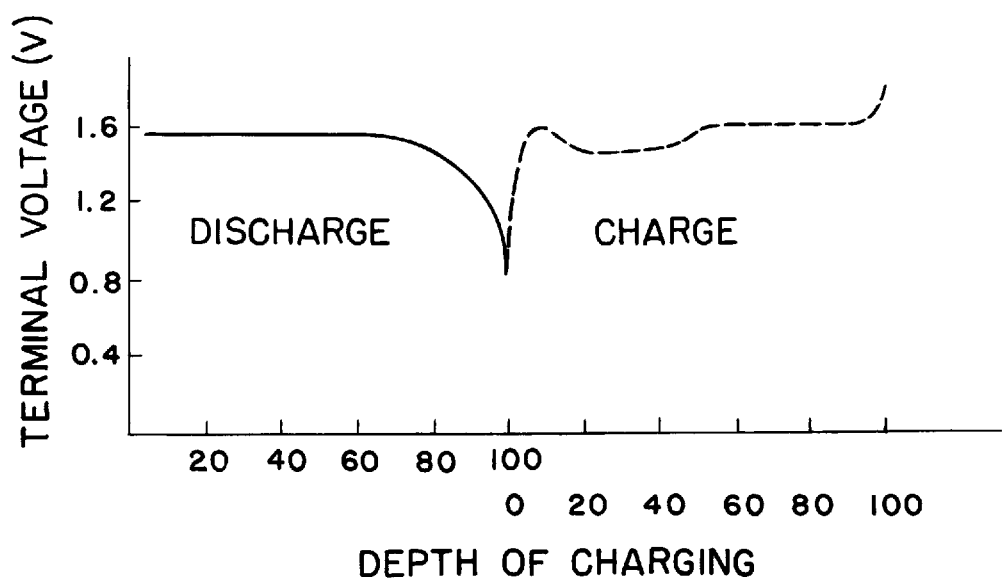
FIG. 9 is a graph showing the galvanic charge-discharge characteristic of the secondary battery shown in FIG. 8 at 0.1 mA/cm$^2$.

The battery worked at the voltage of 1.6 V and showed the 0.1 $mA/cm^2$ of characteristic galvanic charge-discharge progress illustrated in FIG. 9.

The charging efficiency was held above 95% after one hundred repetitions of the charge-discharge cycles.

We claim:

1. A process for synthesizing iron(III) hexacyanoferrate (II) comprising the steps of: preparing a solution containing a $Fe(III)Fe(III)(CN)_6$ complex by mixing a Fe(III) ion-containing solution and a $[Fe(III)(CN)_6]^{3-}$ ion-containing solution; immersing a pair of electrodes in said solution; and electrolytically reducing said $Fe(III)Fe(III)(CN)_6$ complex by effecting electrolysis with one of said pair of electrodes being an anode and the other being a cathode under conditions such that the polarization potential of the cathode is kept between –0.2 volts and +0.8 volts with respect to a saturated calomel electrode to deposit iron(III) hexacyanoferrate(II) as a film of three-dimensional complex on the surface of the cathode.

2. A process for synthesizing iron(III) hexacyanoferrate (II) as set forth in claim 1 wherein electrolysis is effected by a galvanostatic electrolytic method and wherein a constant current is supplied between the electrodes such that the polarization potential of the cathode is kept between –0.2 volts and +0.8 volts.

3. A process for synthesizing iron(III) hexacyanoferrate (II) as set forth in claim 2 wherein the electrolytic current density is constant between 1 $\mu A/cm^2$ and 1 $mA/cm^2$ in terms of the surface area of the cathode electrode of said pair of electrodes.

4. A process for synthesizing iron(III) hexacyanoferrate (II) as set forth in claim 1 wherein the cathode of said pair of electrodes is a solid body which is electronically conductive or semi-conductive at least at the surface and wherein at least the surface of the cathode is composed of a substance selected from the group consisting of an inert metal, electronically conducting metal oxide, electronically semi-conducting metal oxide, conductive plastic material and carbon.

5. A process for synthesizing iron(III) hexacyanoferrate (II) as set forth in claim 1 wherein said cathode is composed substantially of a solid substance selected from the group consisting of inert metal, electronically conducting metal oxide, electronically semi-conducting metal oxide, conductive resin and carbon or said cathode is composed of a non-conductive solid material including ceramic, glass and synthetic resin, which is coated on the surface with a layer including at least one substance selected from the group consisting of an inert metal, carbon, and electronically conductive or semi-conductive metal oxide to provide an electronically conductive or semi-conductive surface.

6. A process for synthesizing iron(III) hexacyanoferrate (II) as set forth in claim 1 wherein the hexacyanoferrate(III) ion-containing solution is a solution having at least one hexacyanoferrate(III) compound dissolved therein which is selected from the group consisting of potassium hexacyanoferrate(III), sodium hexacyanoferrate(III), lithium hexacyanoferrate(III), rubidium hexacyanoferrate (III) and ammonium hexacyanoferrate(III).

7. A process for synthesizing iron(III) hexacyanoferrate (II) as set forth in claim 1 wherein the electrolysis is effected by a potentiostatic electrolytic method in which a reference electrode for determining a reference for electrolytic potential is immersed in the solution containing $Fe(III)Fe(III)(CN)_6$ as well as said pair of electrodes, and wherein the electrode potential of the cathode of said pair of electrodes is controlled so as to be a constant potential in the range between –0.2 V and +0.8 V with respect to the reference electrode when the reference electrode is a saturated calomel electrode.

8. A process for synthesizing iron(III) hexacyanoferrate (II) as set forth in claim 1, wherein electrolysis is effected by a galvanostatic electrolytic method comprising immersing a pair of electrodes in said solution mixture of the iron(III) ion-containing solution, and the hexacyanoferrate(III) ion-containing solution, and supplying between the electrodes a constant current such that the polarization potential of the cathode does not rapidly vary to the negative side and is kept substantially at a constant potential during electrolysis, wherein the electrolytic current density is constant between $1\ \mu A/cm^2$ and $1\ mA/cm^2$ in terms of the surface area of the cathode electrode of said pair of electrodes.

9. A process for synthesizing iron(III) hexacyanoferrate (II) comprising the steps of: immersing a pair of electrodes in a solution mixture of an iron(III) ion-containing solution and a hexacyanoferrate(III) ion-containing solution, effecting electrolysis with one of said pair of electrodes being an anode and the other being a cathode, and maintaining the polarization potential of the cathode between −0.2 volts and +0.8 volts with respect to a saturated calomel electrode to deposit iron(III) hexacyanoferrate(II) as a blue electrolytic product on the surface of the cathode.

10. A process for synthesizing iron(III) hexacyanoferrate (II) as set forth in claim 9 wherein electrolysis is effected by a galvanostatic electrolytic method of supplying between the pair of electrodes a constant current such that the polarization potential of the cathode is kept between −0.2 and +0.8 volts.

11. A process for synthesizing iron(III) hexacyanoferrate (II) as set forth in claim 1 or 9 wherein said Fe(III) ion-containing solution contains an iron(III) salt of an inorganic acid selected from the group consisting of iron(III) chloride, iron(III) sulfate, iron(III) perchlorate, iron(III) nitrate, iron(III) phosphate, and iron(III) pyrophosphate; an iron(III) salt of an organic acid selected from the group consisting of iron(III) oxalate, iron(III) acetate, iron(III) citrate, iron(III) lactate, and iron(III) tartrate; or an iron(III) ammonium salt selected from the group consisting of iron (III) ammonium sulfate, iron(III) ammonium oxalate and iron(III) ammonium citrate.

12. A process for synthesizing, iron(III) hexacyanoferrate (II) as set forth in claim 1 or 9 wherein the solution mixture of the iron(III) ion-containing solution and the hexacyanoferrate(III) ion-containing solution contains as a supporting electrolyte at least one compound selected from the group consisting of an inorganic or organic acid; a metal salt of an inorganic or organic acid and an ammonium salt or tetraalkyl ammonium salt of an inorganic or organic acid.

13. A process for synthesizing iron(III) hexacyanoferrate (II) as set forth in claim 12 wherein said supporting electrolyte is dissolved in a solution mixture containing at least 5 millimoles/liter of both the iron(III) ion and hexacyanoferrate(III) ion and wherein the pH of said solution mixture is adjusted within the range of 0.3 to 5.

14. A process for synthesizing iron(III), hexacyanoferrate (II) as set forth in claim 12 wherein said inorganic and organic acids are selected from the group consisting of hydrochloric acid, sulfuric acid, perchloric acid, nitric acid, phosphoric acid, pyrophosphoric acid, hexafluorophosphoric acid, boric acid, tetrafluoroboric acid, carbonic acid, oxalic acid, acetic acid, citric acid, lactic acid, tartaric acid and phthalic acid and said metal salt of inorganic and organic acids is selected from the group consisting of lithium, sodium, potassium, rubidium, calcium and magnesium salt of said acids.

15. A process for synthesizing iron(III) hexacyanoferrate (II) as set forth in claim 1 or 9 wherein the iron(III) ion-containing solution used is an aqueous solution containing iron(III) ion at a concentration of not less than 10 millimoles/liter, the hexacyanoferrate(III) ion-containing solution is an aqueous solution containing hexacyanoferrate (III) ion at a concentration of not less than 10 millimoles/liter, and the iron(III) ion-containing solution is mixed with the hexacyanoferrate(III) ion-containing solution to form a solution mixture in which the iron(III) ion and the hexacyanoferrate(III) ion are both adjusted to concentrations of at least 5 millimoles/liter.

* * * * *